3,415,410
FUEL TANK FILLER CAP
Enzo Franchini, Turin, Italy, assignor to Fiat Società per Azioni, Turin, Italy
Filed Jan. 18, 1967, Ser. No. 610,159
1 Claim. (Cl. 220—44)

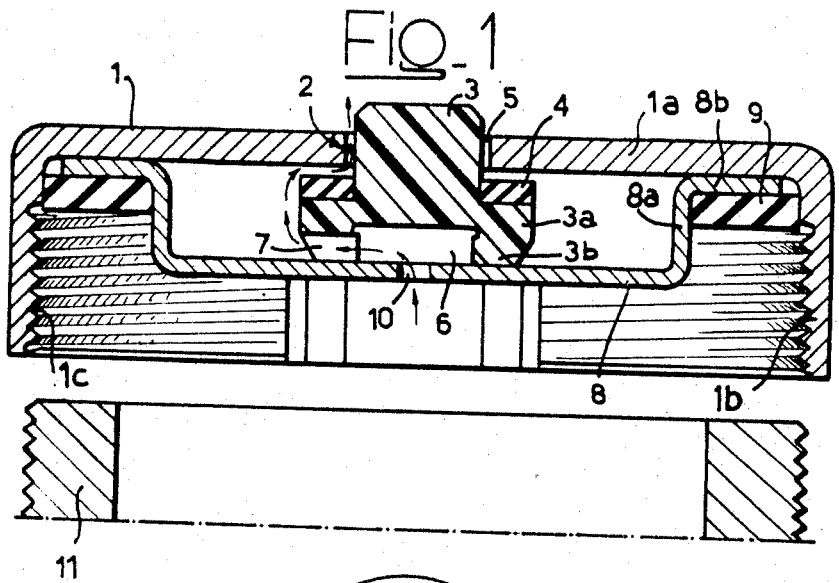
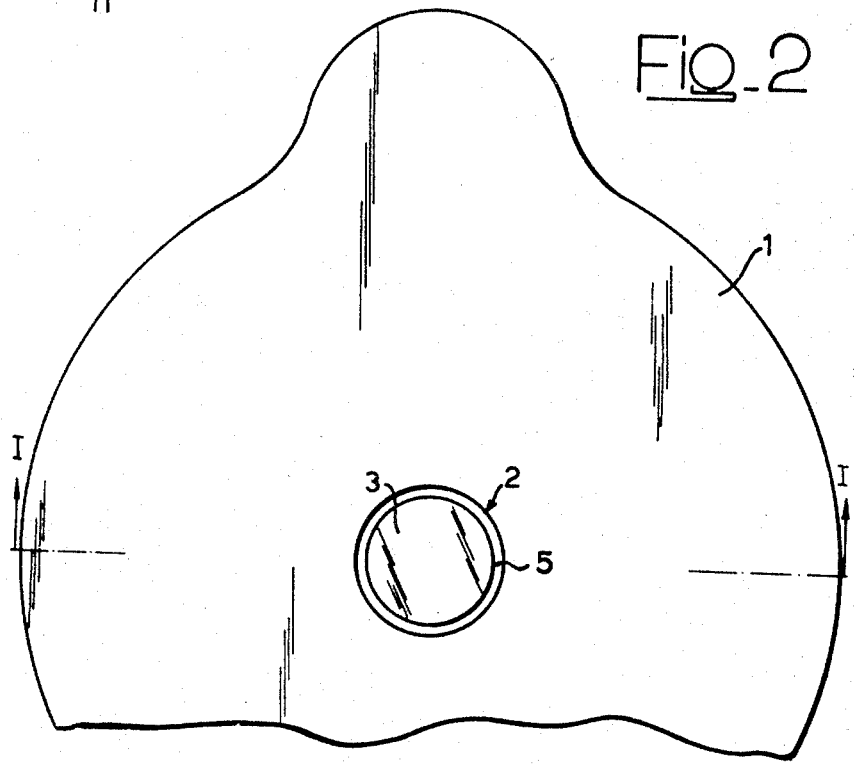

ABSTRACT OF THE DISCLOSURE

The fuel tank filler cap prevents spilling of fuel from the tank through a vent hole in the cap following a collision or sudden overpressure in the tank by means of a valve. The valve has a stem extending through the cap vent hole with radial clearance and a head which seals against the underside of the cap around the hole. A cup-shaped valve retaining member holds the valve so that the stem is always extending through the hole and the vent passage is through the retaining member, through radial passages in the valve head and through the clearance between the valve stem and vent hole. A ring gasket serves not only as a seal with the filler tank neck but also to hold the valve retaining member in place. The filler cap skirt has means for connecting the cap to the filler neck strong enough to prevent the cap from being blown from the neck before the tank fractures in the event of collision.

---

This invention relates to caps employed for closing the filler neck of fuel tanks, more particularly on motor vehicles.

The caps for such use are formed with at least one vent admitting access of air to the tank in order to prevent pulling a vacuum due to withdrawal of the fuel.

The provision of the vent hole or holes is objectionable in that fuel is liable to spill out on building up of an overpressure within the tank.

More particularly, the fuel may escape when by effect of a blow following a collision, the tank wall is deformed and thereby reduced in capacity.

In the latter case if interconnection of the cap and tank is such as to hold the cap in place, fuel spouts to the outside and fire may result.

Where the cap and tank are interconnected by means of a retaining plate sudden rise in internal pressure due to crushing of the tank lifts the cap from its seat creating an annular outlet for the fuel or, at worst, the cap is expelled and a powerful jet of fuel issues and forms an extensive air-fuel mixture mist with a still heavier risk of fire.

This invention provides a cap for the fuel tank on motor vehicles, which obviates the above serious drawbacks.

The cap according to this invention is characterized by the fact that it is provided with a valve associated with the vent hole which valve is adapted to normally maintain the communication between the tank and atmosphere and intercept the said communication when an overpressure builds up within the tank.

According to a further characteristic feature of this invention the fuel tank filler cap is provided with means coupling it to the tank such as to safely hold the cap on its seat though high overpressures may build up within the tank.

The interconnecting means may comprise a tapped portion in the filler cap for screwing on a cooperating screw threaded portion of the filler neck on the tank, or these interconnecting means may be formed by a bayonet coupling means on the filler cap and filler neck.

Further characteristic features and advantages will be understood from the appended detailed description referring to the accompanying drawings given by way of a non-limiting example, wherein:

FIGURE 1 is a middle axial sectional view of a filler cap taken on line I—I of FIGURE 2, and
FIGURE 2 is a plan view of the filler cap.

In the drawings, an outer body 1 of a filler cap for a fuel tank on motor vehicles is bell or cup shaped.

The body 1 is formed with a central vent hole 2. It has a top wall 1a and a skirt portion 1b. The vent hole 2 has movable therein a valve member 3 comprising a cylindrical stem and an enlarged head portion 3a adapted to engage by contact with the inner surface of the body around the vent hole 2. A sealing member 4 is interposed between the abutment formed by the head portion 3a and inner surface.

The stem of the valve member is smaller in diameter than the hole 2, to thereby define an annular port 5. Moreover, the head portion 3a of the valve member is provided on its face remote from the stem 3 with an annular extension 3b having radial notches 7 and a central recess 6 cut therein.

The extension 3b of the valve head 3a bears on a valve head supporting member formed with a valve head supporting circular plate 8 having a flange comprising a first portion 8a extending axially towards the cap top wall 1a, and a second radially extending annular portion 8b the outer diameter of which is smaller than the inner diameter of the cap skirt 1b. The plate 8 is formed with a central hole 10, retained within the body 1 by a resilient annular seal 9 abutted by an upper edge of filler neck 11 on the tank.

Under normal conditions of use the valve member 3 is in its position shown on the drawing in which it bears on the plate 8 by effect of its own weight.

In this position of the valve member the inside of the tank freely connects with the outside to afford venting through the hole 10, chamber 6, notches 7 and annular port 5 along a path denoted by the arrows.

When the pressure suddenly rises within the tank, the valve member 3 is subjected to a thrust opposing the action of its own weight, such as to move it vertically upwards to force the sealing member 4 into firm contact and engagement with the inner surface of the cap top wall 1a. The annular port 5 is thereby closed, as well as communication between the inside of the tank and outside. The thrust is moreover applied to the whole inner surface of the body and tends to tear the cap away from the filler neck.

This is prevented by providing the cap skirt 1b with a screw threaded portion 1c for screwed connection with a cooperating screw threaded portion in the filler neck 11. The parts are so proportioned that, on rise in pressure the fuel tank is fractured before the cap can be torn loose from the filler neck.

According to a modified embodiment not shown on the drawing, the cap and filler neck are provided instead of screw threaded portions with conjugated surfaces for bayonet coupling.

What I claim is:
1. A closure cap for the filler neck of a fuel tank of a motor vehicle, the closure cap comprising; a substantially bell-shaped body having a top with a vent hole and a skirt with means for detachably securing the cap to the filler neck and strong enough to prevent the cap from being torn loose and thrown from the filler neck before the fuel tank is fractured when there is a sudden rise of pressure in the fuel tank in the event of collision, a valve positioned inside the cap, the valve having a stem extending outwardly through the vent hole with radial clearance and having a head portion of a diameter greater than the vent hole so that the head portion is capable of sealing the vent hole by contacting a portion of the inner surface of the cap top surrounding the vent hole, radial notches formed on the face of the valve head portion opposite the bottom of the cap, means for preventing disengagement of the valve stem from within the vent hole including a valve head supporting member positioned within the cap and having a circular valve head supporting plate with a central hole, and a flange having a first portion extending axially toward the cap top and being of a length to allow the valve head to be held in the cap top with the stem always in the vent hole, and a second annular portion extending radially outwardly the diameter of the cap skirt, and a ring of resilient material inserted between the inner surface of the cap skirt and the outer surface of the first portion of the flange of the valve head supporting plate, the ring retaining the valve head supporting plate inside the cap and sealing the cap on the fuel tank filler neck.

References Cited

UNITED STATES PATENTS

| | | | |
|---|---|---|---|
| 2,800,245 | 7/1957 | Doyle et al. | 220—44 |
| 3,083,862 | 4/1963 | Bowden | 220—44 |

JAMES B. MARBERT, *Primary Examiner.*